US007545570B2

(12) United States Patent
Crouch

(10) Patent No.: US 7,545,570 B2

(45) Date of Patent: Jun. 9, 2009

(54) SYSTEM FOR SELECTIVELY BLOCKING ELECTROMAGNETIC ENERGY

(75) Inventor: David D. Crouch, Corona, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/803,403

(22) Filed: Mar. 18, 2004

(65) Prior Publication Data

US 2005/0207019 A1 Sep. 22, 2005

(51) Int. Cl.

| | |
|---|---|
| ***G02B 27/14*** | (2006.01) |
| ***G02B 27/28*** | (2006.01) |
| ***H01P 1/08*** | (2006.01) |
| ***G01N 21/00*** | (2006.01) |
| ***H01Q 3/26*** | (2006.01) |

(52) U.S. Cl. ........................ 359/629; 359/618; 359/485; 359/501; 359/246; 359/285; 333/252; 356/342; 356/495; 342/372

(58) Field of Classification Search ................. 359/629, 359/618, 636, 246, 247, 285, 484, 485, 486, 359/487; 333/251, 252; 356/342, 400, 495; 342/372

See application file for complete search history.

(56) References Cited

U.S. PATENT DOCUMENTS

| | | | | |
|---|---|---|---|---|
| 3,998,552 | A * | 12/1976 | Stewart et al. | 356/342 |
| 4,869,593 | A * | 9/1989 | Biegen | 356/495 |
| 4,948,253 | A * | 8/1990 | Biegen | 356/495 |
| 5,307,073 | A * | 4/1994 | Riza | 342/372 |
| 6,522,226 | B2 | 2/2003 | Crouch et al. | |
| 6,580,561 | B2 | 6/2003 | Crouch et al. | |
| 6,693,605 | B1 | 2/2004 | Crouch et al. | |
| 6,867,919 | B2 * | 3/2005 | Seyfried | 359/618 |
| 2003/0043466 | A1 | 3/2003 | Crouch et al. | |

OTHER PUBLICATIONS

Stein Hollung et al., A Quasi-Optical Isolator, IEEE Microwave and Guided Wave Letters, vol. 6, No. 5, May 1996.

Chao-Chun Chen, Transmission of Microwave Through Perforated Flat Planes of Finite Thickness, IEEE Transactions on Microwave Theory and Techniques, vol. MTT-21, No. 1, Jan. 1973.

IEEE Microwave and Guide Wave Letters, vol. 6, pp. 205-206.

Nakajima and Watanabe in "A Quasioptical Circuit Technology for Short Millimeter-Wavelength Multiplexers," IEEE Trans. Microwave Theory and Techniques MTT-29, pp. 897-905, published Sep. 1981.

* cited by examiner

*Primary Examiner*—Loha Ben

(74) *Attorney, Agent, or Firm*—Schwegman, Lundberg & Woessner, P.A.; Gregory J. Gorrie

(57) ABSTRACT

A system for selectively blocking electromagnetic energy. The system includes a first mechanism for employing a perforated component to pass a beam characterized by a first property and reject a beam characterized by a second property. A second mechanism selectively alters a beam passed by the first mechanism so that upon reflection, the beam exhibits the second property. In a specific embodiment, the first property corresponds to a first polarization, and the second property corresponds to a second polarization. In the specific embodiment, the perforated component includes a beamsplitter having a first perforated metallic plate. The second mechanism includes a quarter-wave plate having a second perforated metallic plate.

29 Claims, 3 Drawing Sheets

SYSTEM FOR SELECTIVELY BLOCKING ELECTROMAGNETIC ENERGY

BACKGROUND OF THE INVENTION

1. Field of Invention

This invention relates to systems for directing or controlling energy. Specifically, the present invention relates to isolators for selectively blocking, redirecting, or absorbing reflected energy, such as microwave energy.

2. Description of the Related Art

Isolators are employed in various demanding applications including communications, space-based remote sensing systems, and military avionics. Such applications demand efficient and cost-effective isolators that can accommodate large amounts of reflected power without damage.

In relatively low-frequency applications involving radio-frequency waves, wave reflections are often attenuated via ferrite-based microstrip or waveguide circulators and isolators. Microstrip implementations of these devices have relatively low power-handling capability, while waveguide-based devices are often unacceptably lossy at multi-kilowatt power levels and frequencies beyond 10 GHz. Ultimately, the power-handling capabilities of waveguide-based isolators and circulators are limited by the dielectric-breakdown limit or air-breakdown limit, which is the electric field strength at which the dielectric or air in the waveguide is ionized. For example, at 95 GHz, a WR-8 waveguide having a cross-section measuring 80 mils (1 mil=0.001 inch) in width and 40 mils in height has a theoretical maximum continuous wave power rating of less than 2.6 kW.

Alternatively, low-power quasioptical isolators having capacitively-loaded linear-to-circular polarization converter grids, capacitively-loaded dipole tuner grids, and resistively-loaded absorber grids are employed. Resistive and capacitively-loaded dipole tuner grids are employed to absorb reflected energy having a predetermined polarization as described by Hollung et al. in "A Quasi-Optical Isolator," IEEE *Microwave and Guided Wave Letters,* Volume 6, pages 205-206, published in May 1996. Unfortunately, these capacitively and resistively-loaded grids have limited power-handling capabilities.

Alternatively, circular polarization duplexers, such as those described by Nakajima and Watanabe in "A Quasioptical Circuit Technology for Short Millimeter-Wavelength Multiplexers," IEEE Trans. *Microwave Theory and Techniques* MTT-29, pages 897-905, published in September 1981, are employed as isolators in low-power applications. Such duplexers employ a wire grid beamsplitter followed by a quarter-wave plate constructed from a dielectric. The quarter-wave plate and beamsplitter are configured so that reflected energy passing back through the quarter-wave plate exhibits a polarization that is reflected by the beamsplitter. Such duplexers, however, are limited to relatively low-power applications, since the dielectric quarter-wave plate has insufficient heat dissipation capabilities for many high-power applications. Furthermore, a high-power incident beam whose electric field is parallel to the wires in the wire-grid beamsplitter will induce large currents in the narrow wires of the beamsplitter, which may cause the beamsplitter to overheat and fail.

Isolators are particularly important in high-power Continuous Wave (CW) microwave/millimeter wave applications, which currently lack mechanisms to block reflected energy, and where reflected energy can damage or destroy microwave sources. Existing systems employing high-power millimeter-wave sources cannot protect expensive vital components from high-amplitude reflections. Unprotected millimeter-wave sources, such as gyrotron oscillators, may experience output window breakage if they are not sufficiently protected from reflected energy. Unfortunately, suitable quasioptical millimeter-wave isolators capable of handling hundreds of kilowatts of average power are typically unavailable.

High-power millimeter-wave sources, such as gyrotron oscillators, may have continuous-wave output power exceeding 100 kW. Such systems demand robust isolation to prevent reflected energy from damaging expensive and sensitive source components.

Hence, a need exists in the art for an efficient system and method that can effectively protect components from high-amplitude energy reflections, such as high-power millimeter wave reflections. There exists a further need for an efficient isolator that is not limited by dielectric-breakdown limits. There exists a further need for a beam source incorporating the efficient isolator.

SUMMARY OF THE INVENTION

The need in the art is addressed by the system for selectively blocking electromagnetic energy of the present invention. In the illustrative embodiment, the system is adapted to protect high-power millimeter wave components from reflected energy. The system includes a first mechanism for employing a perforated component to pass a beam characterized by a first property and to reject a beam characterized by a second property. A second mechanism selectively alters a beam passed by the first mechanism so that upon reflection, the beam exhibits the second property.

In a specific embodiment, the first property corresponds to a first polarization, and the second property corresponds to a second polarization. The perforated component includes a beamsplitter having a first perforated metallic plate. The second mechanism further includes a quarter-wave plate also having a perforated metallic plate. The beamsplitter and the quarter-wave plate have rectangular, square, elliptical, or circular perforations therethrough. The beamsplitter is sufficiently angled so that energy reflecting from the beamsplitter is directed away from the source of the beam of electromagnetic energy.

In the specific embodiment, the beam of electromagnetic energy is a quasioptical beam of electromagnetic energy. The source of the beam of electromagnetic energy is a gyrotron that produces a high-power beam of microwave or millimeter-wave energy.

The novel design of the system is facilitated by the use of thick perforated metallic plates to construct the beamsplitter and the quarter-wave plate. The use of perforated metallic plates to implement the beamsplitter and quarter-wave plate obviates the use of dielectrics, which are susceptible to breakdown and/or overheating. Unlike most dielectric materials, the metal plates have low losses at millimeter-wave frequencies and have a very high thermal conductivity, enabling them to quickly dissipate any absorbed heat. Constructing the key components from metallic plates minimizes undesirable energy loss and provides a low thermal resistance path for the removal of absorbed energy. Moreover, the elimination of dielectrics and restive grids enables isolators that can handle high power levels, such as 100 kW continuous wave power.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
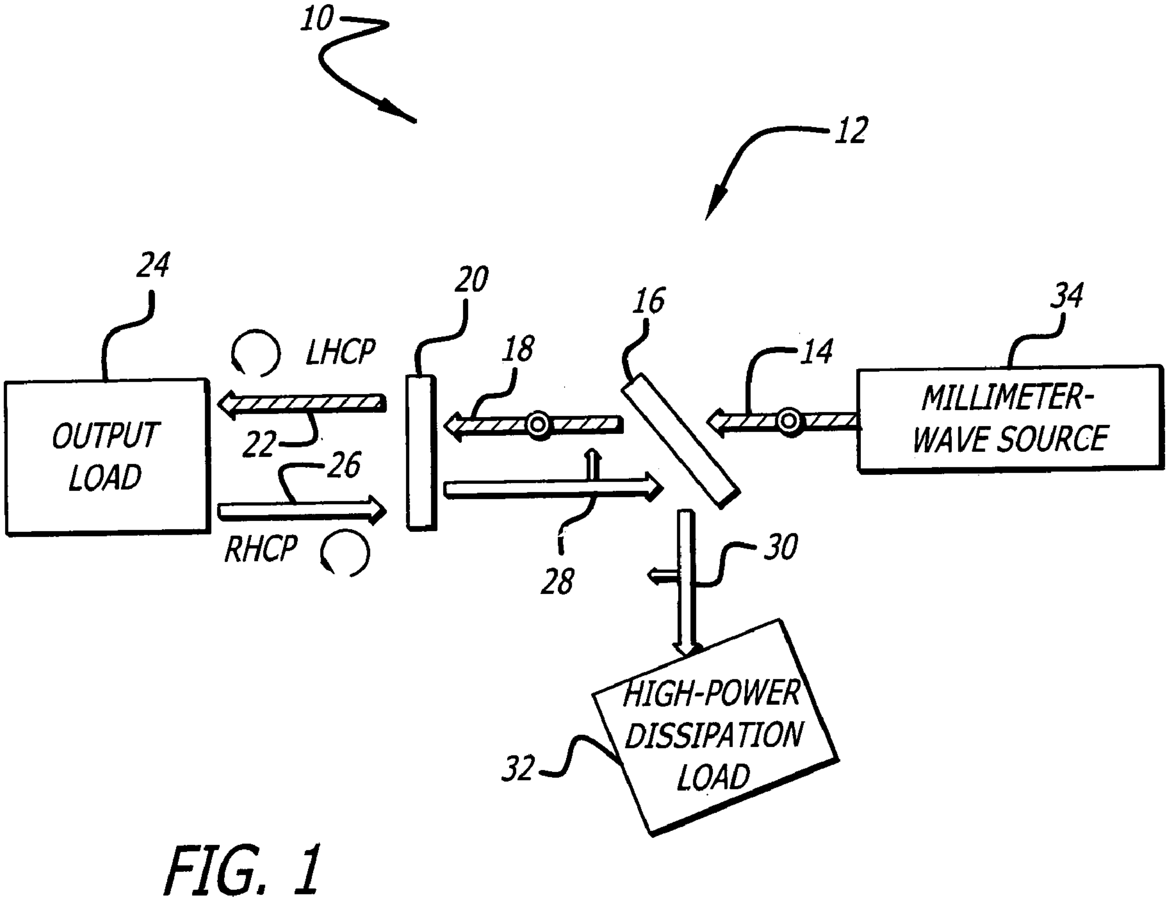
FIG. 1 is a diagram illustrating a quasioptical system having a millimeter-wave isolator with a perforated metallic beamsplitter and a perforated metallic quarter-wave plate constructed in accordance with the teachings of the present invention.

FIG. 1 is a diagram illustrating a quasioptical system 10 having a millimeter-wave isolator 12 with a perforated metallic beamsplitter 16 and a perforated metallic quarter-wave plate 20 constructed in accordance with the teachings of the present invention. For clarity, various features, such as microwave amplifiers, and power supplies, have been omitted from the figures. However, those skilled in the art with access to the present teachings will know which features to implement and how to implement them to meet the needs of a given application.

The quasioptical isolator 12 includes the perforated metallic beamsplitter 16 and the perforated metallic quarter-wave plate 20, which are positioned in series in an optical path between a millimeter-wave source 34 and an output load 24. A high-power dissipation load 32 is positioned relative to the beamsplitter 16 to absorb reflected energy 30 from the beamsplitter 16. High power quasioptical loads, such as the load 32 are often designed so that the incident beam 30 undergoes multiple reflections inside the load 32 and is further attenuated with each reflection. The beamsplitter 16 is angled so that any energy reflecting from the beamsplitter 16 is directed away from the millimeter-wave source 34.

In operation, the quasioptical isolator 12 isolates and protects a millimeter-wave source 34 from reflected energy. The millimeter-wave source 34 transmits an initial quasioptical beam 14, which is characterized by a horizontal linear polarization out of the plane of the page. In the present specific embodiment, the initial quasioptical beam 14 is a high-power millimeter wave beam. For the purposes of the present discussion, a high-power beam is a beam carrying more than 5 kW of average power. A millimeter-wave beam is a beam containing frequencies between 30 and 300 GHz. A quasioptical beam is a beam characterized by a free-space Gaussian mode ($TEM_{00}$). Those skilled in the art will appreciate that other types of beams may be employed without departing from the scope of the present invention. For the purposes of the present discussion, a metallic material is a metal having relatively high electrical and thermal conductivities, such as copper or aluminum.

The initial quasioptical beam 14 impinges on the angled perforated metallic beamsplitter 16, which is angled at approximately 45° relative to the initial quasioptical beam 14. In the present embodiment, the beamsplitter 16 is a perforated metallic beamsplitter having strategically sized and placed rectangular perforations, as discussed more thoroughly below. The perforations are designed and oriented to pass beams having a horizontal linear polarization (into the page), such as the initial quasioptical beam 14, while reflecting minimal horizontally-polarized energy. Any reflected energy is directed away from the millimeter-wave source 34 due to the angle of the perforated metallic beamsplitter 16.

The perforated metallic beamsplitter 16 passes the initial quasioptical beam 14, providing a passed quasioptical beam 18 in response thereto. The passed quasioptical beam 18 is also horizontally-polarized with the electric field vector oriented out of the page. Since the beamsplitter 16 has minimal insertion loss, the passed quasioptical beam 18 is a nearly unattenuated version of the initial quasioptical beam 14.

The perforated metallic quarter-wave plate 20 is positioned at an output of the perforated beamsplitter 16 and receives the passed quasioptical beam 18 as input. When properly oriented with respect to the polarization of the incident wave, the perforated quarter-wave plate 20 converts the passed quasioptical beam 18 into either a Left Hand Circularly Polarized (LHCP) beam or a Right Hand Circularly Polarized beam (RHCP) 22, as desired, which is directed toward the output load 24. The output load 24 may be replaced with other types of components or quasioptical circuitry, such as a quasioptical amplifier or repeater, without departing from the scope of the present invention.

The perforated metallic quarter-wave plate 20 may be implemented as a single plate with rectangular slots or as dual eighth-wave plates perforated with circular holes, as discussed more fully below. In the present specific embodiment, the perforated quarter-wave plate 20 includes two eighth-wave plates with circular perforations therethrough, which are sized and shaped to pass nearly all of the energy in the passed quasioptical beam 18 with minimal insertion loss, while converting the initial linear (horizontal or vertical) polarization into a circular polarization.

A portion of the circularly polarized beam 22 may reflect from the output load 24. As is well known in the art, reflection from a surface will convert a LHCP beam to a RHCP beam, and will also convert a RHCP beam to a LHCP beam. Consequently, reflection of a portion of the circularly polarized beam 22 from the output load 24 yields a reflected beam 26 whose sense of rotation with respect to the direction of propagation is opposite that of the incident beam. The reflected beam 26 passes back to the perforated metallic quarter-wave plate 20.

When the circularly-polarized reflected beam 26 passes back through the quarter-wave plate 20, the quarter-wave plate 20 linearly polarizes the reflected beam 26 and rotates its polarization about the axis of the reflected beam by 90 degrees with respect to the polarization of the incident linearly-polarized quasi-optical beam 18, resulting in a vertically-polarized beam 28 having an electric field vector that is vertical in the plane of the page. The vertically-polarized beam 28 has a polarization that is orthogonal to that of the initial quasioptical beam 14. Consequently, the vertically-polarized beam 28 is reflected by the perforated metallic beamsplitter 16, resulting in the reflected energy 30, which is dissipated by the high-power dissipation load 32.

Hence, the resulting linear polarization of the vertically-polarized beam 28 is orthogonal to the linear polarization of the original incident beam 14. The vertically-polarized beam 28, having orthogonal linear polarization, will reflect from the beamsplitter 16 and will then be dissipated via the high-power load 32. Consequently, the reflected beam 30 is prevented from reaching and damaging the millimeter-wave source 34.

With access to the present teachings, those skilled in the art will know how to construct the perforated beamsplitter 16 and quarter-wave plate 20 to meet the needs of a given application without undue experimentation.

Figure 2:
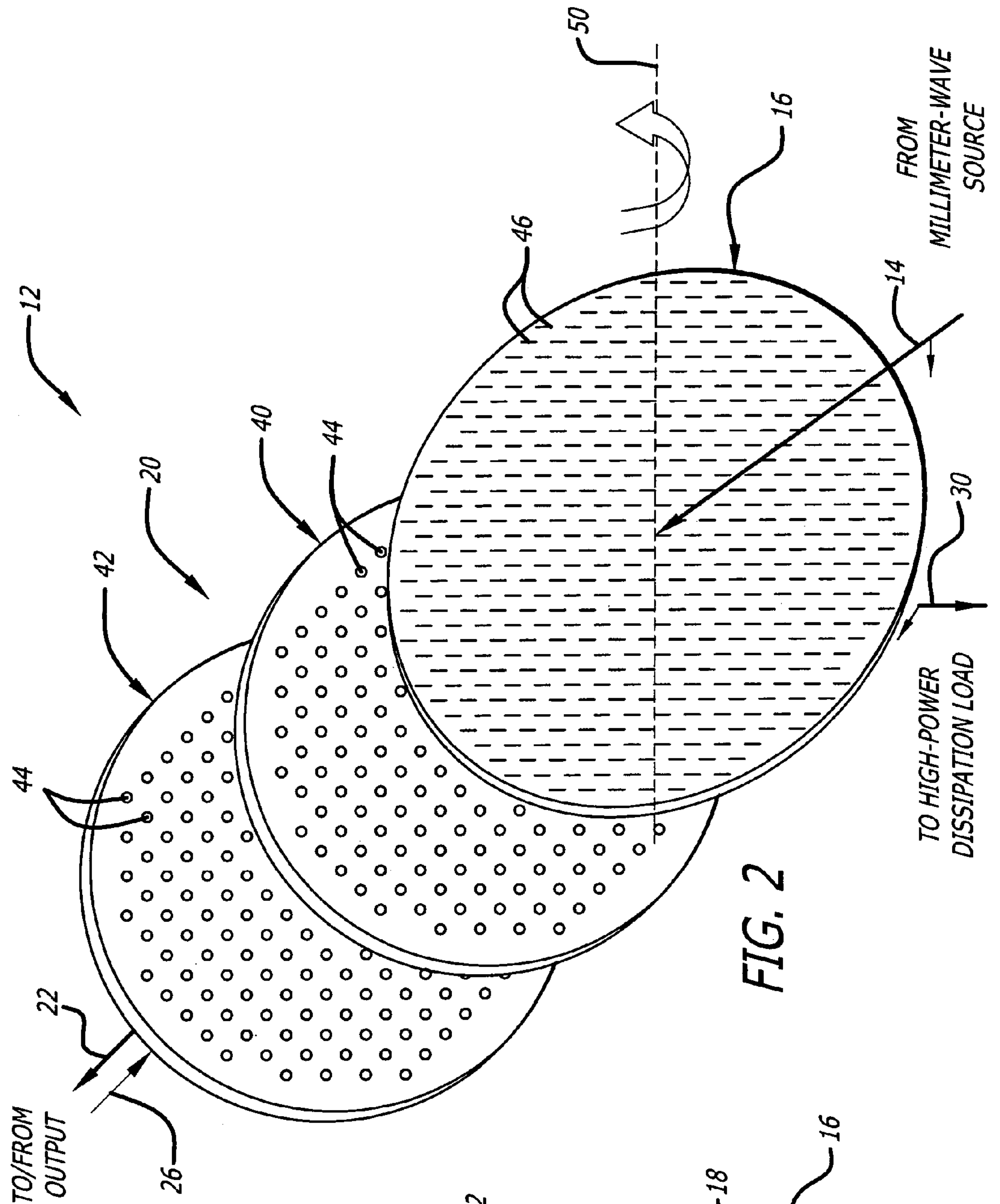
FIG. 2 is a more detailed diagram illustrating the perforated metallic beamsplitter and quarter-wave plate of the isolator of FIG. 1.

FIG. 2 is a more detailed diagram illustrating the perforated metallic beamsplitter 16 and quarter-wave plate 20 of the isolator 12 of FIG. 1. The perforated metallic beamsplitter 16 has rectangular perforations 46 that extend completely through the surface of the beamsplitter 16. The slot dimensions and periodic spacing are optimized to pass the initial horizontally-polarized quasioptical beam of millimeter wave electromagnetic energy 14 and are optimized to reflect the vertically-polarized millimeter-wave electromagnetic energy 30. The exact slot dimensions and spacing are application-specific and may be changed in accordance with properties of the electromagnetic energy for which the isolator 12 will be used. The rectangular perforations 46 may be replaced with other types of perforations, such as square, elliptical, or circular perforations, without departing from the scope of the present invention. A suitable quasioptical beamsplitter is also discussed in U.S. Pat. No. 6,580,561, entitled QUASIOPTICAL VARIABLE BEAMSPLITTER, assigned to the assignee of the present invention and incorporated by reference herein.

In the present specific embodiment, the quarter-wave plate 20 is implemented via a first eighth-wave plate 40 in line with a second eighth-wave plate 42. The eighth-wave plates 40, 42 have circular perforations 44 extending completely therethrough. The dimensions and spacing of the circular perforations 44 are optimized to convert an input horizontally-polarized beam (see beam 18 of FIG. 1) into the circularly-polarized output beam 22 and are optimized to convert the reflected circularly-polarized beam 26 into the vertically-polarized beam 30, which reflects from the beamsplitter 16. The exact dimensions and spacing of the circular perforations 44 are application-specific and may be changed in accordance with properties of the electromagnetic energy for which the isolator 12 will be used. The construction of a suitable quarter-wave plate is also discussed in U.S. patent application Ser. No. 10/231937, entitled VARIABLE QUASIOPTICAL WAVE PLATE AND METHOD OF MAKING, now U.S. Pat. No. 6,693,605, assigned to the assignee of the present invention and incorporated by reference herein. While in the present specific embodiment, the quarter-wave plate 20 is implemented via two eighth-wave plates 40, 42, one skilled in the art may implement the quarter-wave plate as a single plate perforated by an array of rectangular slots.

Exemplary dimensions for a representative design of a single eighth-wave plate at a frequency of 95 GHz are as follows:

a=Hole radius=39 mils $d_x$=Hole spacing in the x direction=103.5 mils $d_y$=Hole spacing in the y direction=118.0 mils d=Plate thickness=251 mils The hole size and spacing and the plate thickness are chosen to minimize the reflected electromagnetic energy from a single plate, regardless of the incident polarization. This allows use of two plates in tandem without the need to maintain a specific distance between the plates. There is a minimum distance of separation, however, determined by the need to avoid coupling of non-propagating near fields from one plate to the other; that is, if D is the distance of separation of the two eighth-wave plates comprising a quarter-wave plate, then $$D \geq \frac{d \ln 100}{2\pi\sqrt{1-\left(\frac{d}{\lambda}\right)^2}}, \qquad [1]$$

where λ is the wavelength of impinging electromagnetic energy, d is the larger of the hole spacings $d_x$ and $d_y$, and a is the hole radius as given above. For the representative design of the present example, $d=d_x=118$ mils and $D \geqq 276$ mils.

The slots of the beamsplitter 16 are oriented relative to the polarization of the incident beam 14 to facilitate nearly complete transmission of the linearly-polarized incident beam 14 and to almost totally reflect the orthogonally-polarized reflected beam 30. Any energy reflected back to the quarter-wave plate 20 will return to the surface of the first eighth-wave plate 42 with a circular polarization having a sense of rotation with respect to the direction of propagation opposite that of the transmitted beam 22, which will then be converted to a vertically-polarized linear polarization at the output of the second eighth-wave plate 40. This vertically-polarized beam is then reflected by the beamsplitter 16 and is directed to the high-power dissipation load 32.

In the present embodiment, the beamsplitter 16 is rotated approximately 45 degrees about an axis of rotation 50 so that the return beam 30 reflects downward. To facilitate transmission of the incident beam 14 through the beamsplitter 16, the electric field of the incident beam 14 is parallel to the surface of the beamsplitter 16, and is shown extending to the left in FIG. 2 for illustrative purposes.

In the present specific embodiment, the thick metallic plates 16, 40, 42 are circular plates made from a suitable conductor, such as copper or aluminum. The metallic material comprising the plates 16, 40, 42 is highly conductive (both electrically and thermally), non-magnetic (permeability of the metal is approximately equal to the permeability of free space ($\mu=\mu_0$)), will not sustain a net charge distribution ($\rho=0$), and is incapable of exhibiting dipole moments. Use of conductive metallic plates provides significant power-handling capability. The excellent thermal properties of perforated metallic plates enable superior high-power microwave and millimeter wave components, such as windows and beamsplitters.

The millimeter wave quasioptical isolator 12 obviates the need for dielectric materials incorporated into the isolator components. By omitting dielectric materials, which are often susceptible to breakdown and overheating, and employing thermally conductive metallic plates 16, 40, 42 to implement the isolator 12, the isolator 12 exhibits power-handling capabilities that are far superior to conventional isolators.

The metallic plates 16, 40, 42 are sufficiently thick to provide a thermally conductive and low-resistance path to quickly remove absorbed energy. Consequently, the temperature at the center of the plates 16, 40, 42 may readily be maintained at safe levels. For very high power applications in which absorbed heat cannot be removed quickly enough by conduction alone, cooling channels can be incorporated into the metallic plates 16, 40, 42 to facilitate active cooling using water or some other suitable coolant.

Both the beamsplitter 16 and the quarter-wave plate 20 are periodic, frequency-selective structures. The exact dimensions of the plates 16, 40, 42 and spacing of the perforations 44, 46 are application-specific and may be chosen by one skilled in the art to meet the needs of a given application without undue experimentation. These parameters are chosen to yield the desired performance at the desired operating frequency.

Those skilled in the art may employ a method-of-moments code based on a formulation such as that described by C. C. Chen in "Transmission of Microwave Through Perforated Flat Plates of Finite Thickness," IEEE Trans. Microwave Theory Tech. MTT-21, 1-6 (1973) to facilitate choosing the appropriate dimensions.

In this formulation, for an incident plane wave, the fields on each side of the beamsplitter 16 and/or eighth-wave plates 40, 44 are expanded in terms of a finite number of Floquet modes. Floquet modes are a set of orthonormal plane waves having the same periodicity and wavelength as the incident wave 14 in planes parallel to the surface of the plate, but propagating in different directions. The fields inside the perforations 44, 46 are expanded in terms of waveguide modes. By imposing the boundary conditions on the tangential electric and magnetic fields at the two surfaces of the beamsplitter 16 and/or eighth-wave plates 40, 44, a matrix equation for the coefficients of the waveguide modes can be derived. When the waveguide mode coefficients are known, the amplitudes of the reflected and transmitted waves can be determined.

The use of a periodic array of perforations 44, 46 imposes constraints on the design of the beamsplitter 16 and the quarter-wave plate 20. For the desired angle of incidence, the perforations 44, 46 are arranged so that grating lobes are not excited. For example, if the perforations are arranged in an isosceles-triangular pattern, grating lobes are not excited if the horizontal distance ($d_x$) between perforation centers and the vertical distance ($d_y$) between perforation centers satisfy the following equations:

$$2\frac{\lambda}{d_x} \geq 1 + \sin\theta, \quad \frac{\lambda}{d_y} \geq 1 + \sin\theta, \qquad [2]$$

$$\left(\frac{\lambda}{d_x}\right)^2 + \left(\frac{\lambda}{2d_y}\right)^2 \geq (1 + \sin\theta)^2,$$

where $\lambda$ is the wavelength of incident electromagnetic energy; and $\theta$ is the approximate angle of incidence of the electromagnetic energy on the quarter-wave plate or the beamsplitter with respect to the direction normal to the surface of the beamsplitter 16 or eighth-wave plates 40, 42.

For example, at a frequency of 95 GHz and an incident angle of 45° (the angle at which the incident beam impinges upon the beamsplitter), $d_x$ and $d_y$ must satisfy the following equations:

$$d_x < 145.6 \text{ mils}, \quad d_y < 72.8 \text{ mils} \qquad [3]$$

$$\left(\frac{1}{d_x}\right)^2 + \left(\frac{1}{2d_y}\right)^2 \geq 1.888 \times 10^{-4} \text{ mils}^{-2},$$

where the variables are as described above.

If the perforations are arranged in a rectangular pattern, $d_x$ and $d_y$ must satisfy the following equations:

$$\frac{\lambda}{d_x} > 1 + \sin\theta, \quad \frac{\lambda}{d_y} > 1 + \sin\theta, \qquad [4]$$

where the variables are as described above. If $\theta=0$ (the angle at which the beam passed by the beamsplitter impinges upon the first eighth-wave plate), then $$d_x < 124.2 \text{ mils}, \; d_y \leqq 124.2 \text{ mils}. \qquad [5]$$

Additional theoretical background pertaining to transmission of microwaves through perforated flat surfaces is provided in the above-identified paper published in IEEE Transactions on Microwave Theory and Techniques.

Figure 2A:
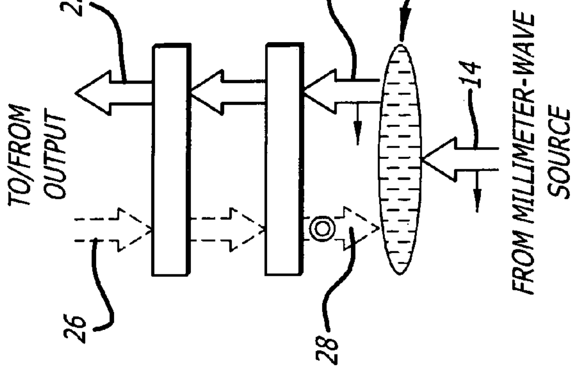
FIG. 2*a* is a top view of the perforated metallic beamsplitter and quarter-wave plate of the isolator shown in FIG. 2.

FIG. 2*a* is a top view of the perforated metallic beamsplitter and quarter-wave plate of the isolator shown in FIG. 2. The vertically-polarized reflected beam 28 output from first eighth-wave plate 40 reflects from the beamsplitter 16, resulting in the return beam 30 (See FIG. 2), which passes downward, which is into the page in FIG. 2*a*. The return beam 30 is not shown in FIG. 2*a*, as it is obscured by the beamsplitter 16.

Figure 3:
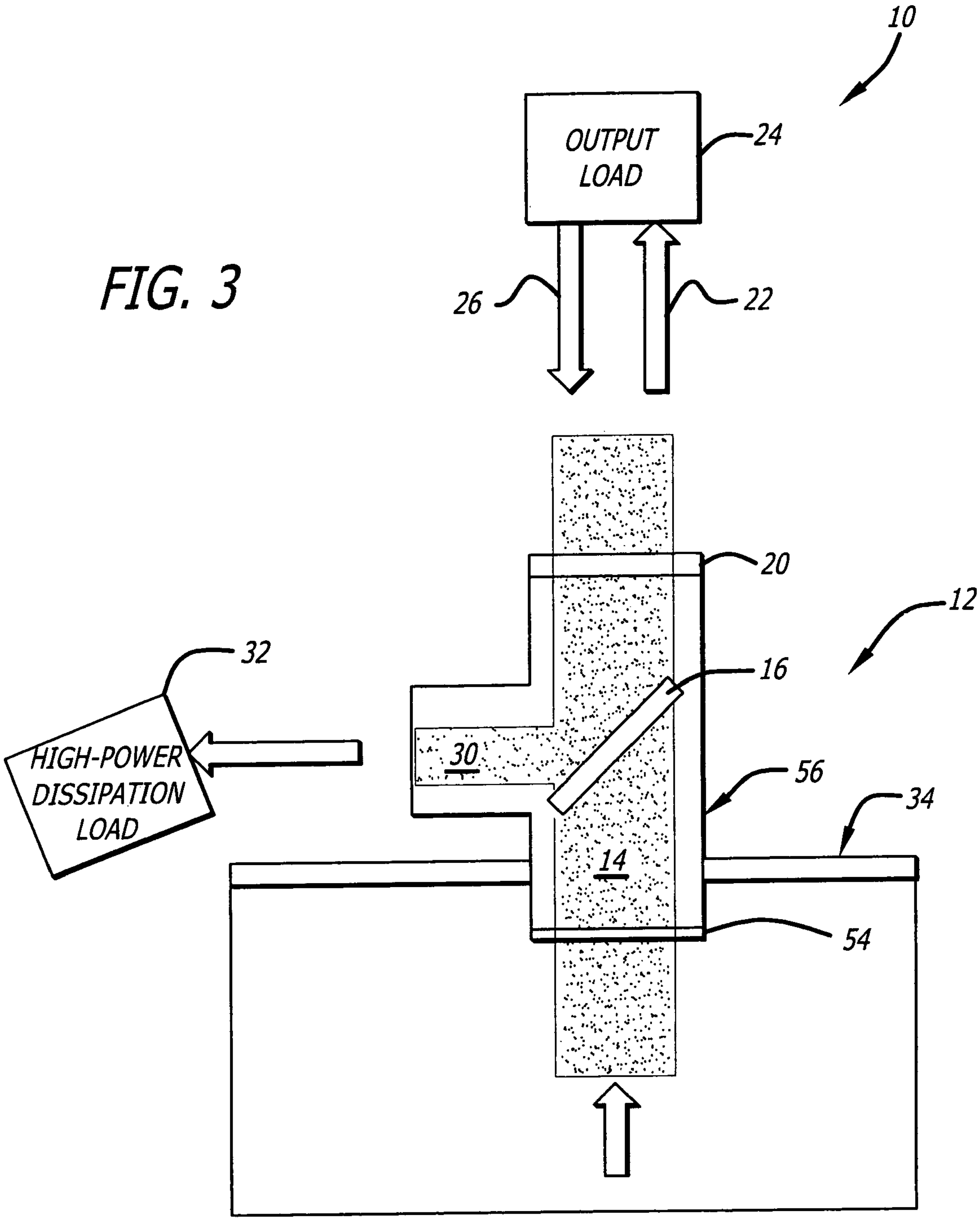
FIG. 3 is an illustrative diagram of the quasioptical system of FIG. 1 employing a gyrotron.

FIG. 3 is an illustrative diagram of the quasioptical system 10 of FIG. 1 employing a gyrotron 34. The millimeter-wave source 34 of FIG. 1 is implemented as a gyrotron 34 in FIG. 3. Only the area near the output of the gyrotron 34 is shown in FIG. 3. The gyrotron 34 transmits the initial high-power quasioptical millimeter-wave beam 14 through a gyrotron output window 54.

In the present specific embodiment, the gyrotron 34 is a self-contained millimeter-wave source that generates a quasioptical output beam 14. The gyrotron 34 may be one component of a quasioptical transmitter (not shown), which could include a millimeter-wave source (e.g., a gyrotron) and a high-voltage power supply, and perhaps a computer (not shown).

The gyrotron 34 is a microwave vacuum electron device that generates very high power levels (both peak and average) at millimeter-wave frequencies. Gyrotrons have been constructed to generate output powers over 1 MW at frequencies well over 100 GHz. Due to the high frequency and the high power levels, the gyrotron 34 provides output into a quasioptical beam waveguide 56.

The high-power quasioptical isolator 12 can be incorporated into an integrated window assembly that includes the output window 54, the metallic beamsplitter 16, and the metallic quarter-wave plate 20. The output window 54 is a low-loss window that allows the high-power quasioptical millimeter wave beam to exit the gyrotron. Simultaneously, the output window 54 maintains the integrity of the vacuum inside the gyrotron, which must be maintained at an extremely low pressure (~$10^{-9}$ torr) in order for the gyrotron to operate properly. The output window 54 may be integrated with the gyrotron 34.

Moreover, the output window 54 may also be constructed from a perforated metallic plate, as described in U.S. Pat. No. 6,522,226, entitled TRANSPARENT METALLIC MILLIMETER-WAVE WINDOW, which is herein incorporated by reference. The use of a perforated metallic plate for the window 54 is relatively cost-effective.

Like most microwave vacuum electron devices, gyrotrons are relatively delicate and cannot tolerate high-amplitude reflections, especially long-pulse and continuous wave gyrotrons. Large amplitude reflections, if not removed quickly, often lead to failure of gyrotron output windows, such as the output window 54. Use of the quasioptical isolator 12 protects the gyrotron 34 from such reflections.

High-power millimeter-wave systems producing more than 100 kW at frequencies over 100 GHz are employed in various applications, including fusion research. The gyrotron oscillator 34 produces a Gaussian-beam (quasioptical beam)

output that is launched into the beam waveguide 56, wherein the isolator 12 is mounted. Applications requiring transmission of multi-kilowatt average power levels at millimeter-wave frequencies often employ quasioptical transmission.

Until the development of the present invention, quasioptical millimeter-wave isolators capable of handling such high-energy beams were unavailable. Consequently, conventional gyrotron sources, which often lack mechanisms to protect vital components from high-amplitude reflections, were often damaged by reflected energy, requiring costly and time-consuming repairs.

At sufficiently high power densities, the electric field of the quasioptical beam 14 may cause breakdown as it passes through the slots near the center of the beamsplitter 16 or quarter-wave plate 20, if the slots are too small. One solution involves designing the perforated metallic components 16, 20 so that the electric field does not reach the levels at which breakdown occurs. Alternatively, the quasioptical beam 14 is spread out before it impinges on the isolator components 16, 20, thus lowering the maximum power density to an acceptable level. This may be readily performed via mirrors (not shown). Mirrors may also facilitate refocusing the resulting output beam, such as the beam 22. If required, an additional mirror (not shown) can be used to reduce the diameter of the output beam 22 to its original value after the beam 22 has exited the isolator components 16, 20. Such modifications may be readily performed by those skilled in the art to meet the needs of a given application.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

What is claimed is:

1. A system for selectively blocking electromagnetic energy comprising:

first means for employing a perforated component to pass a beam characterized by a first property and reject a beam characterized by a second property and second means for selectively altering said beam passed by said first means so that, upon reflection from a surface of a load located downstream from said second means, said beam exhibits said second property.

2. The system of claim 1 wherein said first property corresponds to a first polarization, and said second property corresponds to a second polarization.

3. The system of claim 2 wherein said perforated component includes a beamsplitter having a first perforated metallic plate.

4. The system of claim 3 wherein said second means includes a quarter-wave plate having a second perforated metallic plate.

5. The system of claim 4 wherein said quarter-wave plate is implemented via two perforated metallic eighth-wave plates.

6. The system of claim 4 wherein said beamsplitter and said quarter-wave plate have rectangular, square, elliptical, or circular perforations therethrough.

7. The system of claim 6 wherein said beamsplitter is sufficiently angled so that energy reflecting from said beamsplitter is directed away from a source of said beam.

8. The system of claim 7 wherein said beamsplitter is angled approximately 45 degrees relative to said beam.

9. The system of claim 8 wherein said beam is a quasioptical beam.

10. The system of claim 9 wherein said source of said beam is a gyrotron that produces a high-power beam of microwave or millimeter-wave energy.

11. The system of claim 4 wherein perforations in said beamsplitter and said quarter-wave plate are spaced in accordance with the following equations for perforation patterns arranged in an isosceles triangle and in a rectangle, respectively:

$$2\frac{\lambda}{d_x} \geq 1 + \sin\theta, \quad \frac{\lambda}{d_y} \geq 1 + \sin\theta \text{ and}$$

$$\frac{\lambda}{d_x} > 1 + \sin\theta, \quad \frac{\lambda}{d_y} > 1 + \sin\theta,$$

where λ is the wavelength of said beam; θ is the approximate angle of incidence of said beam on said quarter-wave plate or said beamsplitter; $d_x$ represents horizontal distance between perforation centers; and $d_y$ represents vertical distance between perforation centers.

12. A system for selectively redirecting electromagnetic energy comprising:

first means for changing polarization of said electromagnetic energy from a first polarization to a second polarization and second means for employing said second polarization to block and/or reflect said electromagnetic energy characterized by said second polarization via one or more perforations.

13. The system of claim 12 wherein said first means includes a perforated quarter-wave plate.

14. The system of claim 13 wherein said perforated quarter-wave plate is a perforated metallic quarter-wave plate.

15. The system of claim 14 wherein said second means includes a perforated metallic beamsplitter.

16. The system of claim 15 wherein said electromagnetic energy includes a quasioptical beam.

17. The system of claim 16 wherein said quasioptical beam is a high-power microwave beam.

18. A quasioptical millimeter-wave isolator comprising:

a perforated metallic quarter-wave plate sufficient to change polarization of a quasioptical beam to be blocked and/or redirected from a first polarization to a second polarization and a perforated metallic beamsplitter sufficient to block and/or reflect said quasioptical beam characterized by said second polarization.

19. A millimeter-wave source comprising:

first means for generating a quasioptical beam of electromagnetic energy of a first polarization;

second means for transmitting said quasioptical beam through a perforated plate, said perforated plate passing the energy of the first polarization and reflecting and/or absorbing energy of a second polarization; and third means for imparting said second polarization to energy reflected back from a surface of a load located downstream from said third means toward said source so that said second means reflects and/or absorbs said energy reflected back toward said source.

20. The source of claim 19 wherein said third means includes a perforated metallic quarter-wave plate.

21. The source of claim 20 wherein said second means includes a source output window and a perforated metallic beamsplitter.

22. A method for selectively blocking electromagnetic energy comprising the steps of:

passing a beam of electromagnetic energy with a perforated component having a first polarization and rejecting electromagnetic energy having a second polarization and selectively altering said first polarization of the beam of electromagnetic energy passed by said perforated component with another component so that a beam of electromagnetic energy reflected by a surface of a load located downstream from said other component exhibits said second polarization before impinging on said perforated component.

23. The method of claim 22 wherein said other component is a perforated component.

24. A system for selectively blocking electromagnetic energy comprising:

a perforated metallic beamsplitter adapted to pass a beam characterized by a first property and to reject a beam characterized by a second property and means for selectively altering said beam passed by said perforated metallic beamsplitter so that, upon reflection from a surface of a load located downstream from said means, said beam exhibits said second property.

25. The system of claim 24 wherein said metallic beamsplitter is a perforated metallic beamsplitter, and wherein said means for selectively altering said beam is a perforated metallic quarter-wave plate.

26. A system for selectively blocking electromagnetic energy comprising:

first means for employing a perforated component to pass a beam characterized by a first property and reject a beam characterized by a second property and a metallic quarter-wave plate adapted to selectively alter said beam passed by said first means so that upon reflection from a surface of a load located downstream from said plate, said beam exhibits said second property.

27. The system of claim 26 wherein said metallic quarter-wave plate is perforated, and wherein said first means includes a perforated metallic beamsplitter.

28. A system for selectively blocking electromagnetic energy comprising:

a metallic beamsplitter adapted to pass a beam characterized by a first property and to reject a beam characterized by a second property and a metallic quarter-wave plate adapted to selectively alter said beam passed by said metallic beamsplitter so that, upon reflection from a surface of a load located downstream from said plate, said beam exhibits said second property.

29. The system of claim 28 wherein said metallic beamsplitter and/or said metallic quarter-wave plate include perforations therein.

* * * * *